United States Patent [19]

Ouchi et al.

[11] Patent Number: 5,011,460
[45] Date of Patent: Apr. 30, 1991

[54] BELT TENSIONER WITH ELASTIC DAMPING FEATURE

[75] Inventors: Hideo Ouchi, Sagamihara; Kouichi Sakai, Zama, both of Japan

[73] Assignee: Nippon Seiko Kabushiki Kaisha, Tokyo, Japan

[21] Appl. No.: 491,218

[22] Filed: Mar. 9, 1990

[30] Foreign Application Priority Data

Mar. 16, 1989 [JP] Japan .................................. 1-62164
Apr. 14, 1989 [JP] Japan .................................. 1-93052

[51] Int. Cl.$^5$ .............................................. F16H 7/12
[52] U.S. Cl. .................................... 474/133; 474/135
[58] Field of Search ............... 474/101, 109, 111, 113, 474/115, 118, 133, 135, 139; 267/166–168, 180

[56] References Cited

U.S. PATENT DOCUMENTS

| Re. 30,842 | 1/1982 | Speer | 474/135 |
| 3,975,965 | 8/1976 | Speer | 474/135 |
| 4,270,906 | 6/1981 | Kraft et al. | 474/135 |
| 4,285,676 | 8/1981 | Kraft | 474/135 |
| 4,392,840 | 7/1983 | Radocaj | 474/117 |
| 4,472,162 | 9/1984 | Hitchcock | 474/135 |
| 4,473,362 | 9/1984 | Thomey et al. | 474/135 |
| 4,504,254 | 3/1985 | Foster | 474/133 |
| 4,525,152 | 6/1985 | Speer et al. | 474/133 |
| 4,557,707 | 12/1985 | Thomey | 474/101 |
| 4,689,037 | 8/1987 | Bytzek | 474/135 |
| 4,813,915 | 3/1989 | Kotzab | 474/133 |

Primary Examiner—William P. Neuder
Attorney, Agent, or Firm—Hedman, Gibson, Costigan & Hoare

[57] ABSTRACT

The belt tentioner includes a solid damping device between the pivotal member and the fixed member, and the amount of deformation of the solid damping device and that of a spring are adapted to be set independently of each other.

This permits the vibration damping operation by the solid damping device and the tensioning operation by the spring to be performed under the respective optimum conditions.

12 Claims, 4 Drawing Sheets

BELT TENSIONER WITH ELASTIC DAMPING FEATURE

FIELD OF THE INVENTION

This invention relates to a belt tensioner and, more particularly, to a belt tensioner for affording an appropriate tension to a belt for Automotive Engine Accessory such as an alternator or a compressor, or a timing belt of an automotive engine.

RELATED ART

FIG. 1 shows a belt driving mechanism for driving an auxiliary device for an automotive engine, such as an alternator, compressor or an oil pump for power steering.

Referring to FIG. 1, a crankshaft of an engine, not shown, drives a driving pulley 2 into rotational movement. Driven pulleys 3, 3 are secured to the ends of input shafts of various Accesories. The belt 1 is placed around the driving pulley 2, driven pulley 3, 3 and guide pulleys 4, 4. An appropriate tension is applied to the belt i by a tension pulley 5.

This tension pulley 5 is pivotally mounted at the end of a pivotal plate member 7 which is adapted to rotate about a pivot 6 as the center of rotation. A spring 8 has its one end connected to the plate member 7 for resiliently biasing the tension pulley 5 towards the belt 1 by means of spring force of the spring B. This maintains the tension on the belt 1 perpetually at a constant value despite changes in size, that is elongation of the belt 1 caused by prolonged usage.

The belt tensioner for perpetually affording an appropriate tension on the belt 1 In thIs manner is required to exhibit the following functions.

First, when the tension is changed with elongation of the belt 1, that is, when the belt is slackened, the belt tensioner must follow the belt movement. Second, when the belt 1 is subjected to oscillations of minute amplitudes, the belt tensioner must suppress the belt 1 to prevent these oscillations from being amplified.

In this connection, there is known a belt tensioner as disclosed in the U.S. Pat. No. 4,473,362.

This conventional belt tensioner is constructed as shown in FIG. 2.

In FIG. 2, a stationary shaft 10 is secured by a bolt 9 to a base plate 11. A rubber buffer tube 12 is press-fitted on the outer peripheral surface of the stationary shaft 10.

A tension pulley 5 is pivotally mounted on the end of the pivotal plate member 7. A holding tube 13 of synthetic resin is secured to the proximal end of the plate member 7. A metallic sleeve 14 is secured to the inner peripheral surface of the holding tube 13. The sleeve 14 is slidably inserted over the buffer tube 12.

A coil spring 16 exhibiting resiliency in the torsional direction is provided between a housing 15 secured to the base plate 11 and the pivotal plate member 7. A spring force for biasing the belt 1 toward the tension pulley 5 is provided by means of the coil spring 16.

The above described belt tensioner operates as follows.

When the belt resiliently abutted on by the tension pulley 5 is subjected to oscillations of minute amplitudes, the rubber buffer tube 12 absorbs these oscillations. When the belt is deviated conspicuously, the inner peripheral surface of the sleeve 14 slides against the outer peripheral surface of the buffer tube 12 to bring about a rotational movement of the plate member 7. This causes the tension pulley 5 to follow the belt movement.

However, the above described conventional belt tensioner constructed and acting as described above cannot be said to exhibit sufficient oscillation damping performance or sufficient durability.

That is, for absorbing the belt oscillations of minute amplitudes, it is necessary for the inner peripheral surface of the sleeve 14 and the outer peripheral surface of the buffer tube 12 to abut on each other with an appropriate pressure. If this pressure is deviated from a predetermined value, sufficient oscillation damping performance cannot be achieved.

Furthermore, the above pressure tends to be lowered gradually due to wear or degradation of the rubber buffer tube 12 caused by prolonged usage to cause loose engagement between the sleeve 14 and the buffer tube 12.

When such loose engagement is brought about between the sleeve 14 and the buffer tube 12, it becomes impossible to suppress the belt oscillations of minute amplitudes so that the function of the belt tensioner cannot be performed satisfactorily.

The belt tensioner for affording an appropriate tension on the belt is also disclosed in Japan Utility Model KOKAl Publication 63-77154 (1988) and U.S. Pat. Nos. 4,525,152 and 4,504,254. These belt tensioners are complicated in the oscillation dampIng structure and expensive to manufacture while being unable to effectively damp the oscillations of minute amplitudes.

SUMMARY OF THE INVENTION

The belt tentioner of the present invention includes a solid damping device between the pivotal member and the fixed member, and the amount of deformation of the solid damping device and that of a spring are adapted to be set independently of each other.

This permits the vibration damping operation by the solid damping device and the tensioning operation by the spring to be performed under the respective optimum conditions.

PREFERRED EMBODIMENTS

Figure 1:
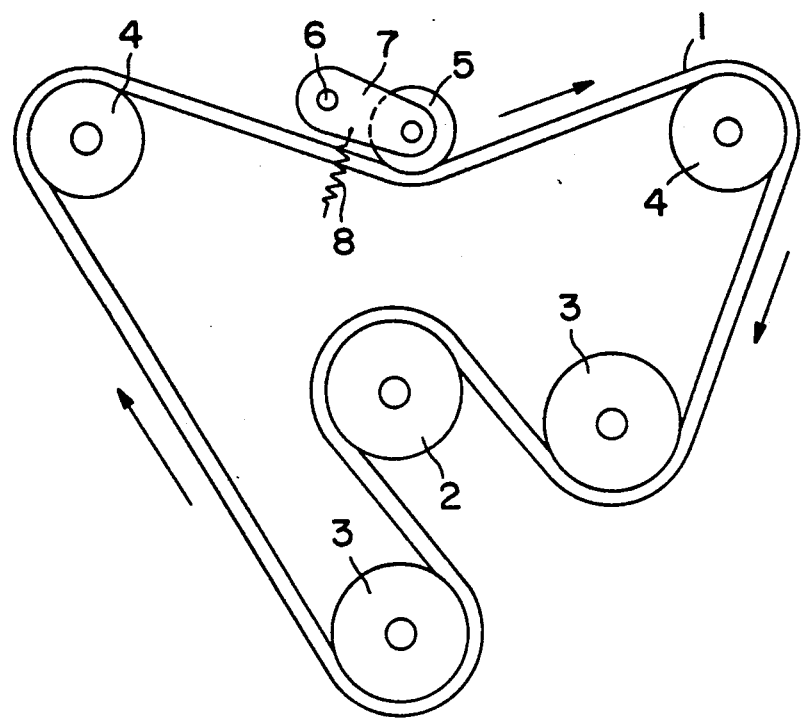
FIG. 1 is a front view showing an engine timing belt driving provided with a belt tensioner.

In a first embodiment, shown in FIG. 3 to 6, a stationary member 41 has a fixed shaft 17 (first shaft) and a housing member 18. The fixed shaft 17 is generally cylindrical, whereas the housing member 18 is in the form of a bottomed cylinder. One end of the fixed shaft 17 (the upper end thereof in FIG. 3) is continuous to a bottom section 18a of the housing member 18. This housing member 18 is constituted by the bottom section 18a and a peripheral wall section 18b continuous to the periphery of the bottom section 18b and coaxial with the fixed shaft 17. A supporting tube section 20 formed at the proximal end of the pivotal plate member 19 is fitted over the fixed shaft 17 by way of a slide bearing 21.

At the proximal end of the plate member 19 is formed another housing member 22 in the form of a bottomed cylinder of a shorter height so that the housing member 22 is continuous to and surrounds the supporting tube section 20. These housing members 22, 18 are assembled together with the opening ends facing to each other to constitute a housing 25. This housing 25 accommodates a torsion coil spring 23 and a rubber tube 24 as later described.

Figure 3:
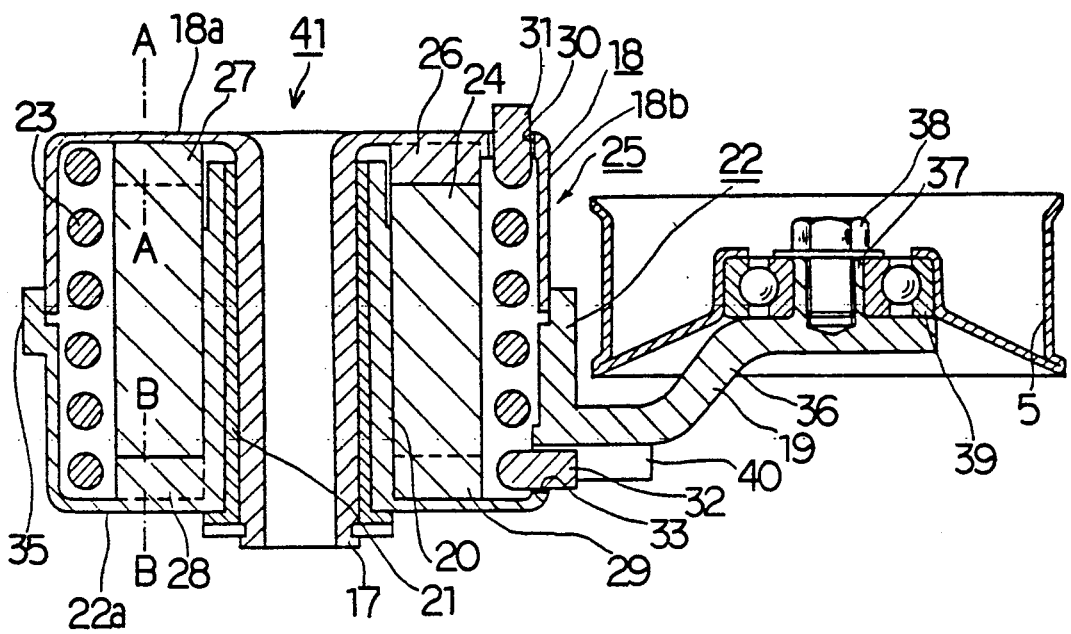
FIG. 3 is a cross-sectional view showing a first embodiment of the present invention.
Figure 6:
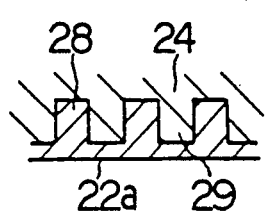
FIG. 6 is a cross-section taken along line B—B of FIG. 3.

On the inner surface of the bottom section 18a of the housing member 18 connected with the fixed shaft 17 integrally, there is formed a first meshing section 26 in the form of alternate projections and recesses, as shown in FIG. 3 and 6. On one end face in the axial direction (in the vertical direction of FIG. 3) of the rubber tube 24 as the solid damper, that is, on the upper end face thereof in FIG. 3, there is formed second meshing section 27, in the form of alternate projections and recesses. The second meshing section 27 is adapted for engaging with the first meshing section 26.

On the inner surface of the bottom section 22a of the housing member 22, connected to the supporting tube section 20, there is formed a third meshing section 28 in the form of alternate projections and recesses, as shown in FIGS. 3 and 6.

On the other end face in the axial direction of the rubber tube 24, that is the lower end thereof in FIG. 3, there is formed a fourth meshing section 29 in the form of alternate projections and recesses. The fourth meshing section 29 is adapted for engaging with the third meshing section 28.

In the assembled state of the belt tensioner of the present invention, the first meshing section 26 engages with the second meshing section 27, while the third meshing section 28 engages with the fourth meshing section 29. Hence, with displacement of the fixed tube 17 and pivotal plate member 19, stress is applied to the rubber tube 24 in the torsional direction.

Figure 2:
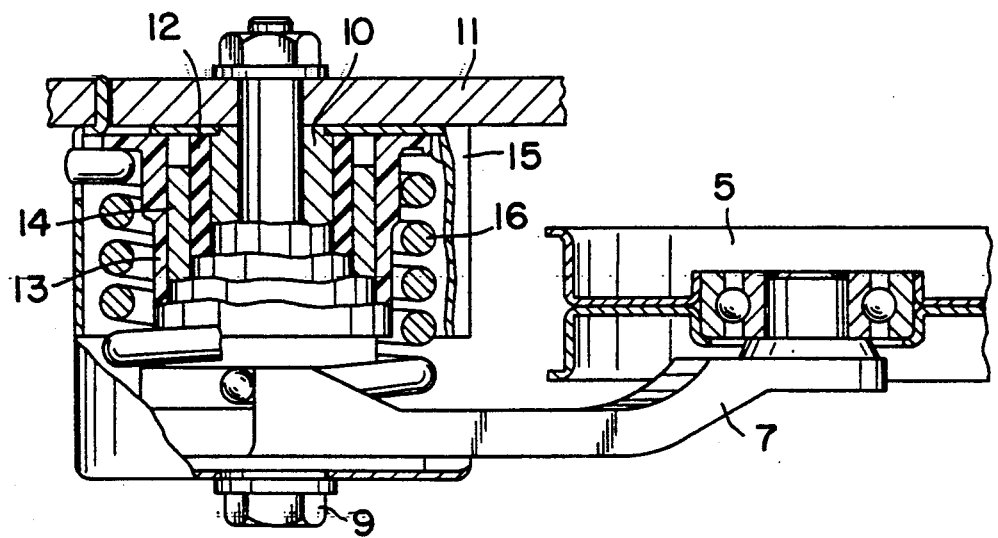
FIG. 2 is a cross-sectional view showing an embodiment of the conventional belt tensioner.

An elongated slot hole 30 is formed along the circumference of the bottom section 18a of the housing member 18. A first locking section 31 formed at one end of the torsion coil spring 23 is adapted to be protruded out of the housing member 18 through the slot hole 30. The first locking section 31 thus protruded out of the housing member 18 is inserted into a mating hole, not shown, formed in a base plate 11 (FIG. 2) to which the belt tensioner is attached. The base plate 11 forms, for example, the lateral surface of the engine. The slot hole 30 formed in the bottom section 18a facilitates the insertion of the locking section 31.

A through-hole 33 is formed on the perimeter of the housing member 22 formed integrally with the pivotal plate member 19. Into this through-hole 33 is passed a second locking section 32 formed at the other end of the torsion coil spring 23. On the opening end edges of the paired housing members 18, 22, there is formed an engaging section in the form of projections 34, 35 (FIG. 4) which abut against each other when the housing member 18, 22 are assembled together. This engaging section restricts relative displacement between the housing members 18, 22 despite resiliency of the torsion coil spring 23.

That is, when the first locking section 31 formed at one end of the torsion coil spring 23 is inserted into the mating hole in the base plate 11 via slot hole 30, and the second locking section 32 formed at the other end of the coil spring 23 is inserted into the through-hole 33 formed in the housing member 22, a spring force of the torsion coil spring 23 is applied to the housing member 22 in the direction in which the housing member 22 is rotated about the fixed shaft 17 as the center of rotation. The amount of rotation of the housing member 22 is restricted by the paired engaging section constituted by the projections 34, 35. This prevents the torsion coil spring 23 to be relaxed or freed completely. Thus the torsion coil spring 23 is in a prestressed condition even before a tension pulley 5 is pressed onto the belt, as will be described subsequently.

In the thus prestressed condition of the torsion coil spring 23, torsional stress is applied to the rubber tube 24 between the paired housing members 18, 22. It is noted that the prestress applied to the coil spring 23 is independent from the stress applied to the rubber tube 24, so that the stresses to the spring 23 and to the rubber tube 24 may differ from each other if so desired. That is, the amount of the prestress applied to the torsion coil spring 23 is determined from the viewpoint of applying an appropriate tension to the belt, whereas the amount of the stress applied to the rubber tube 24 is determined from the viewpoint of achieving effective oscillation damping. Meanwhile, from the relation between the characteristics of the torsion coil spring 23 and those of the rubber tube 24, the stresses applied to the spring 23 and to the rubber tube 24 may eventually be equal to each other.

The proximal end of an arm member 36 is connected to the outer peripheral surface of the housing member 22 on the side of the pivotal plate member 19 to which the spring force is applied from the torsion coil spring 23, as mentioned previously. A rolling bearing 39 is supported on a pivot shaft 37 on the foremost lateral side of the arm member 36 by means of a bolt 38. The tension pulley 5 is rotatably carried by the rolling bearing 39. The axis of rotation of the tension pulley 5 (second axis) coincides with the axis of rotation of the rolling bearing 39 and runs parallel to the fixed shaft 17. Hence, when the pivotal plate member 19 is rotated by the spring force of the torsion coil spring 23 about the fixed shaft 17 (first axis) as the center of rotation, the outer peripheral surface of the tension pulley 5 is pressed against the belt.

Figure 4:
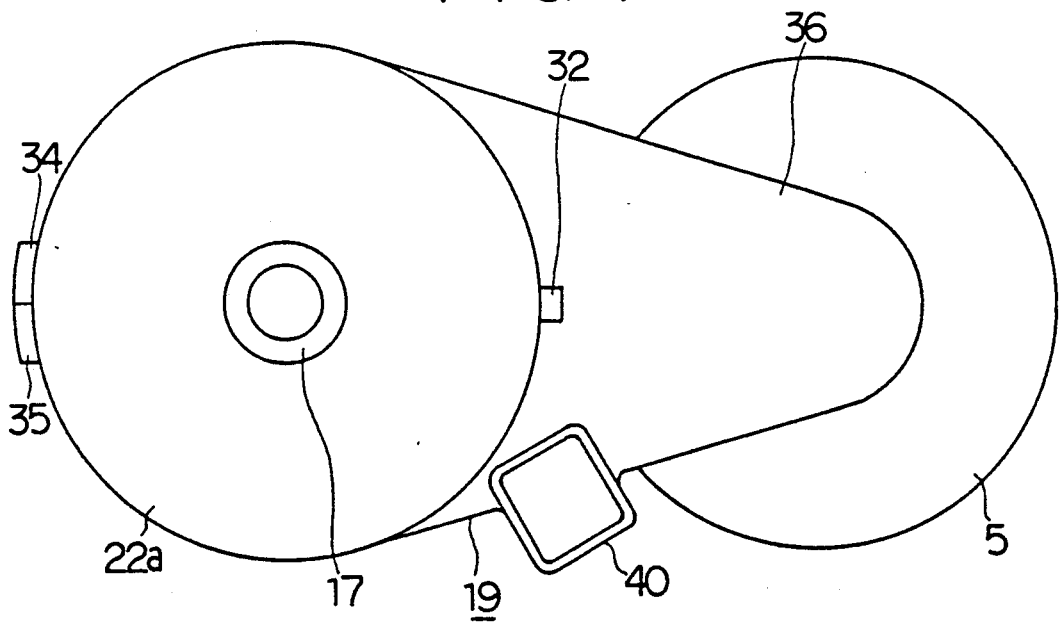
FIG. 4 is a front view, as seen from the bottom side of FIG. 3.
Figure 5:
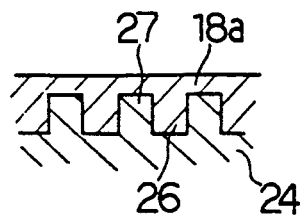
FIG. 5 is a cross-section taken along line A—A of FIG. 3.

In FIG. 3 and 4, with an end of a square wrench applied to a square tube 40, the plate member 19 may be rotated by the operation of the square wrench against the spring force of the torsion coil spring 23.

The above described belt tensioner of the present invention is attached at a predetermined front surface portion to a base plate such as a lateral plate of an engine block. Thus the cylindrical fixed shaft 17 of the belt tensioner is fixed to the base plate by bolt 9, shown in FIG. 2 but not shown in FIG. 3, inserted from the upper portion of FIG. 3. During this attachment operation, at one end of the torsion coil spring 23, the first locking section 31 projecting from the bottom section 18a of the housing member 18 is locked in the mating hole in the base plate.

With the belt tensioner thus attached in position to the front surface of the base plate, the end of the square wrench is applied to the square tube 40 and operated to rotate the plate member 19 against the spring force of the torsion coil spring 23. The tension pulley 5 pivotally mounted at the foremost part of the plate member 19 is moved away from the running path of the belt 1 (FIG. 1). After the belt 1 is hooked in this state on the tension pulley 5, the torsional force applied to the plate member 19 by means of the square wrench and the like is released.

In this state, the plate member 19 is rotated under the spring force of the torsion coil spring 23. The outer peripheral surface of the tension pulley 5 pivotally mounted at the foremost part of the plate member 19 is pressed against the belt 1. In this manner, an appropriate tension is applied to the belt i as a function of the spring force of the torsion coil spring 23.

When the belt 1 pressed against the tension pulley 5 is subjected to oscillations of small amplitudes, that is to repeated abrupt increases in tension of the belt 1, these oscillations are transmitted via ball bearing 39 to the pivotal plate member 19. As a result, the pivotal plate member 19 tends to be rotated against the spring force of the torsion coil spring 23.

When the plate member 19 is about to be rotated, torsional stress is applied to the rubber tube 24. When the rubber tube 24 is de formed, the rubber tube 24 is subjected to internal hysteresis losses. Hence, where a torsional stress is applied to the rubber tube 24, the major portion of the stress is consumed as the hysteresis losses. The result is the damping of the oscillations applied to the plate member 19.

With the belt tensioner of the present invention, the amount of the torsional deformation applied to the rubber tube 24 in advance is set independently of the pre-stress applied to the torsion coil spring 23 so that maximum hysteresis losses will be produced. The result is the satisfactory oscillation damping effect afforded by the rubber tube 24.

On the other hand, when the tension of the belt 1 is changed appreciably due to elongation of the belt 1 caused by prolonged usage, that is, when the tension is lowered, the plate member 19 is rotated by the spring force of the torsion coil spring 23, with the fixed shaft 17 as the center of rotation. The tension pulley 5 pivotally mounted at the foremost part of the plate member 19 is caused to follow the movement of the belt 1 continue to apply the appropriate tension to the timing belt 1.

Meanwhile, for providing the second and the fourth meshing sections 27, 29 on both end faces of the rubber tube 24 as the solid damping member, first and second metallic members previously formed with the second and fourth meshing sections 27, 29 may be secured to both ends of the rubber tube 24 by adhesion or baking. When the second and the fourth meshing sections 27, 29 are formed in this manner, there is no risk of local stress concentration at the ends of the rubber tube 24 even when torsional stress is applied to the rubber tube 24.

The meshing sections may be formed in the metal members in well-known manner by machining, forging, press working, casting or punching.

With the above described construction and operation, the belt tensioner of the present invention is superior in durability and in oscillation damping performance and assures prevention of belt vibrations and proper belt tension for an extended period of time.

Figure 7:
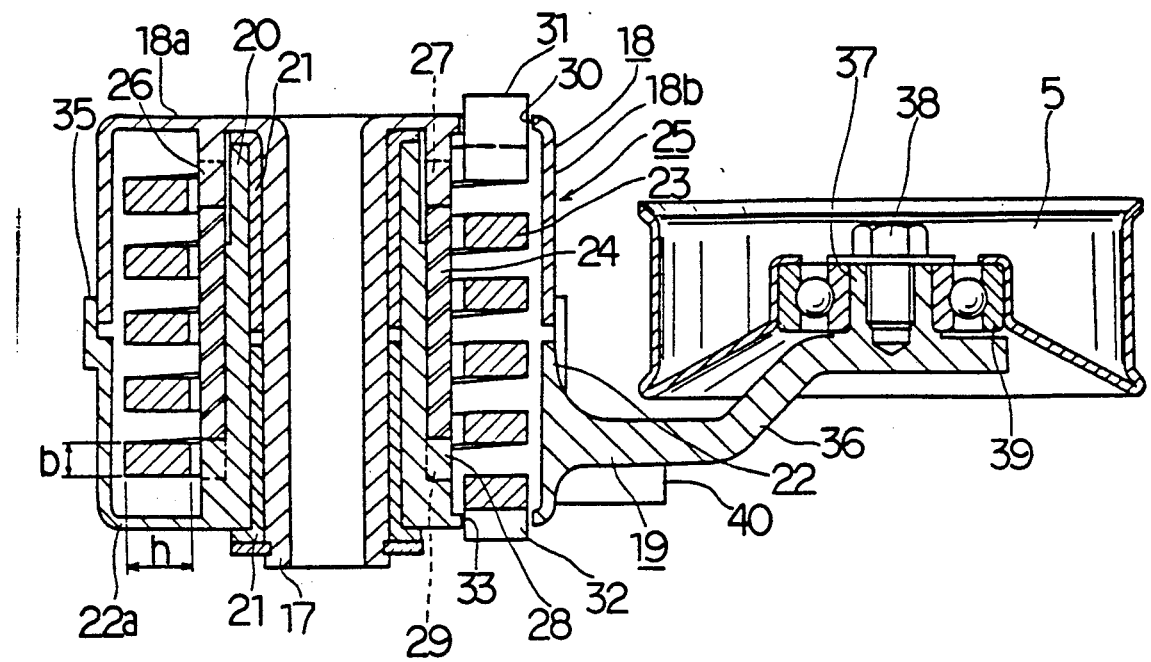
FIG. 7 s a cross-sectional view showing a second embodiment of present invention.

The second embodiment of the present invention is explained by referring to FIG. 7.

In the present embodiment, the torsion coil spring 23 pressing the tension pulley 5 against the belt 1 shown in FIG. 1 is formed by winding into coil of a wire material which has a rectangular cross-section along the coil axis having a radial size or the length of a long side equal to h and an axial size or the length of a short side equal to b. During winding, the wire material is bent orthogonally to the short side so that the long side is placed at right angles with the fixed shaft 17.

When the tension pulley 5 is displaced due for example to slackening of the belt 1, the torsion coil spring 23 is displaced simultaneously. In the present embodiment, the spring constant of the torsion coil spring 23 is set to a smaller value. Consequently, when the belt 1 is slackened, the spring force of the torsion coil spring 23 pressing the tension pulley 5 against the belt 1 remains substantially unchanged, such that a stable tension can be continuously applied to the belt 1. In addition, such reduction in the spring constant of the torsion coil spring 23 does not result in reduction of the maximum torque that can be applied within the torque capacity of the torsion coil spring 23, that is within the range of not causing fatigue to the torsion coil spring 23.

Figure 8:
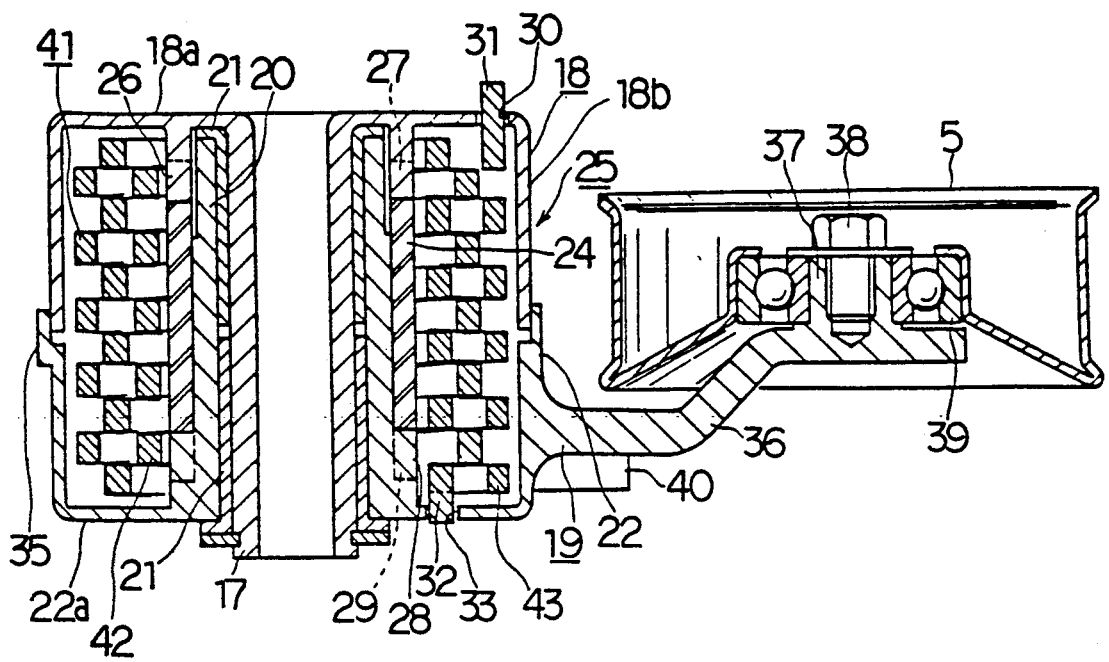
FIG. 8 is a cross-sectional view showing a third embodiment of present invention.
Figure 11:
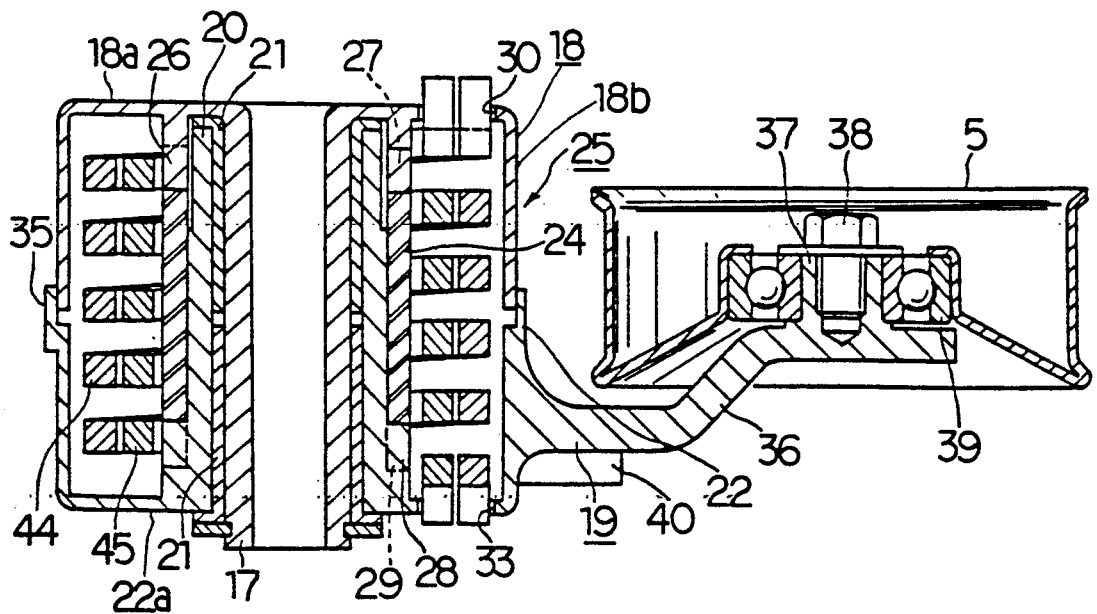
FIG. 11 is a cross-sectional view showing a fourth embodiment of present invention.

More specifically, for reducing the spring constant without changing the torque capacity, it s necessary to increase the number of turns and the cross-sectional coefficient of the torsion coil spring 23. The cross-sectional coefficient of a wire material having the cross-section of a rectangle with the length h of the long side and the length b of the short side may be approximated by $bh^2/6$. If the number of turns of the torsion coil spring 23 is to be increased in such case, the winding pattern need be of a so-called tight winding in which there is no gap between adjacent coil turns. In FIGS. 7, 8 and 11, the state of tight winding is not illustrated for simplicity. With the same overall length, that is the vertical size in FIG. 7, of the torsion coil spring 23, the number of turns of the torsion coil spring 23 in the tight winding pattern is inversely proportionate to the length b of the short side. Therefore, for increasing the number of turns and the cross-sectional coefficient of the torsion coil spring 23 with this conditions, it suffices to make the long side h longer and the short side b shorter. That is, if the lengths h, b of the long side and the short side of the cross-section of the wire constituting the torsion coil spring 23 are increased and decreased, respectively, within the reasonable designing limits, it becomes possible to reduce the spring constant as well as to provide a satisfactory torque capacity. On the other hand, stable tension can be continuously applied to the belt 1, at the same time that the size of the belt tensioner may be reduces.

The following is a calculation for ascertaining the effect of changing the cross-section of the wire of the torsion coil spring 23 from a circular shape to a rectangle shape.

As predicates for calculation, the following numerical conditions have been adopted.

The space accommodating the torsion coil spring is a cylinder having the inside diameter of 20 mm, an outside diameter of 30 mm and a length of 30 mm. Thus the coil diameter D is 25 mm.

The allowable stress $\sigma$ of the material (spring steel) of the torsion coil spring of 50 kgf/mm$^2$ and the longitudinal elastic modulus E is 21200 kgf/mm$^2$.

The width W of the cylindrical space is $(30-20)/2=5$ mm. Hence, when the wire having a circular cross-section is used as the wire constituting the torsion coil spring, the diameter d of the cross-section is equal to 5 mm, whereas, when the wire having a rectangular cross-section is used as the wire constituting the tortion coil spring, the length of h of the long side is equal to 5 mm. In the latter case, the short side b is set to 3 mm long.

Hence, with the torsion coil spring which is formed of a wire material having a circular cross-section, the number of turns $n_1=30/5-1=5$, whereas, with the torsion coil spring which is formed of a wire material having a rectangular cross-section, the number of turns $n_2=30/3-1=9$.

Under these conditions, the torque capacity T1 and the spring constant K1 of the torsion coil spring which is formed of a wire material having a circular cross-section, as well as the torque capacity T2 and the spring constant K2 of the torsion coil spring formed of a wire material having a rectangular cross-section, may be formed as follows:

$$T_1 = \sigma\pi d^3/32$$
$$= 613.59 \text{ (kgf} \cdot \text{mm)}$$
$$T_2 = \sigma bh2/6$$
$$= 625 \text{ (kgf} \cdot \text{mm)}$$
$$K_1 = Ed^4/64Dn_1$$
$$= 1656.25 \text{ (kgf} \cdot \text{mm/rad)}$$
$$K_2 = Ebh^3/12$$
$$= 937.25 \text{ (kgf} \cdot \text{mm/rad)}$$

It is seen from the above results that the torque capacity and the spring constant can be increased and decreased, respectively, by changing the cross-section of the wire material of the torsion coil spring from the circular to the rectangular shape.

The increase in torque capacity is tantamount to reduced size of the belt tensioner, whereas the decrease in the spring constant is tantamount to increased stability in the tension applied to the belt by the belt tensioner.

The construction and the operation of the present illustrative embodiment are otherwise the same as those of the first embodiment described in connection with FIGS. 3 to 6.

Figure 9:
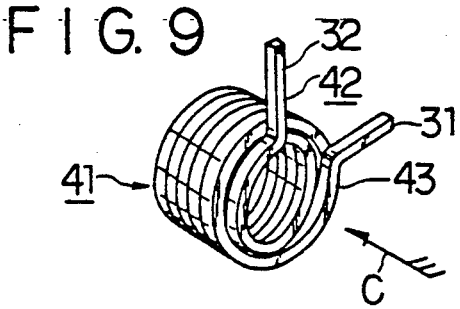
FIG. 9 is a perspective view showing a torsion spring employed in the third embodiment.
Figure 10:
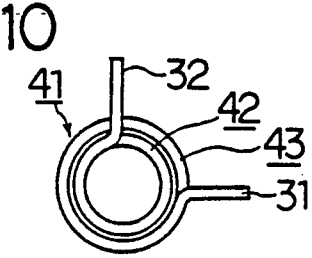
FIG. 10 is a view looking in the direction of an arrow C in FIG. 9.

A third embodiment of the present invention is now explained by referring to FIGS. 8 to 10.

In the present embodiment, a single wire having a rectangular cross-section with a smaller radial length is wound multiplexionally (triplexionally in FIG. 8 and duplexionally in FIGS. 9 and 10) to produce a torsion coil spring 41, which is used in lieu of the torsion coil spring 23 of the above second embodiment having a flat rectangular cross-section along the direction of the coil axis. Although the wire material constituting the torsion coil spring 41 of the present embodiment has a rectangular cross-section, it may also have a circular or other cross-sections.

With the present torsion coil spring 41, an outer coil section 43 having a first locking section 31 is provided around an inner coil section 42 formed at one end with a second locking section 32, with the other ends of the inner and the outer coil sections 42, 43 being connected to each other. The first and second locking sections 31, 32 may be projected axially as shown in FIG. 8 or radially as shown in FIGS. 9 and 10.

In the present embodiment, when designing or spatial constraints are imposed on the cross-sectional shape of the wire material of the torsion coil spring 41, it is possible to reduce the spring constant of the torsion coil spring 41 as well as to produce its proper torque capacity.

The constructing and the operation of the present illustrative embodiment are otherwise the same as in the above described second embodiment.

FIG. 11 is a cross-sectional view showing a fourth embodiment of the present invention.

In the present embodiment, a plurality of, herein two, torsion coil springs 44, 45, combined into a multiplexed cylinder, are used in lieu of the torsion coil spring 23 of the above second embodiment having a flat rectangular cross-section in the direction of the coil axis. In the present embodiment, the wire material of the torsion coil springs 44, 45 may also be circular instead of being rectangular in cross-section.

In the present embodiment, since the spring constants of the torsion coil springs 44, 45 may be reduced sufficiently, it is possible to reduce the spring constant of the juxtaposed torsion coil springs 44, 45, as well as to procure a torque capacity of the torsion coil springs, even when the designing or spatial constraints are imposed on the cross-section of the wire material constituting the torsion coil springs 44, 45.

The construction and the operation of the present illustrative embodiment are otherwise the same as those of the above described second embodiment.

Figure 12:
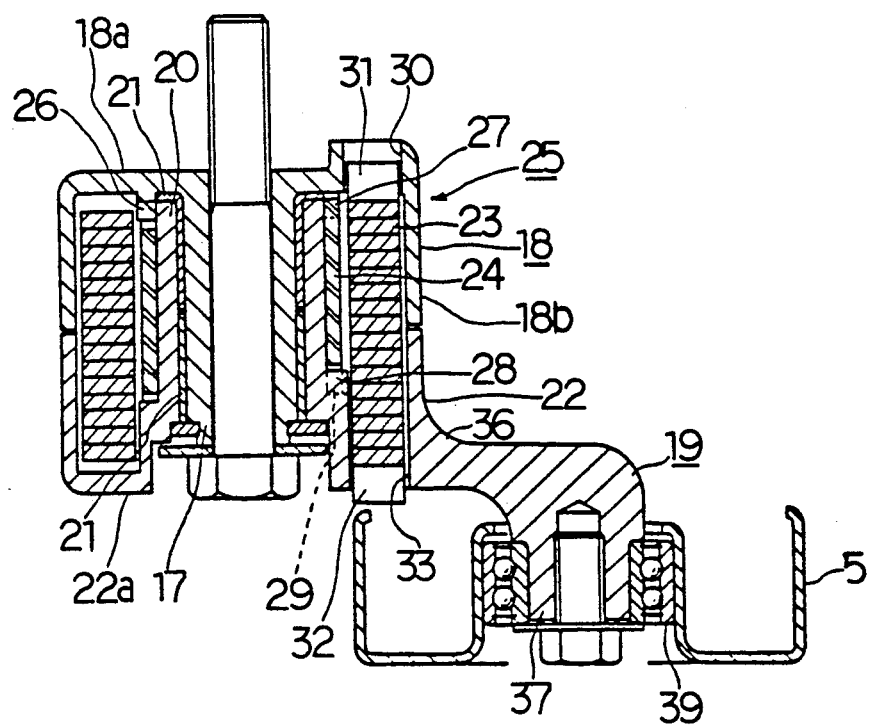
FIG. 12 is a cross-sectional view showing a fifth embodiment of the present invention.

FIG. 12 illustrates a fifth embodiment of the present invention.

In the present embodiment, the length of the arm member 36 formed on the outer peripheral surface of the housing member 22 is set so as to be shorter than those in the above described first to fourth embodiments.

The tension pulley 5 is pivotally supported at the foremost part of the arm member 36 on the surface opposite to the housing 25.

As a results in the present embodiment, although the distance between the tension pulley 5 and the base plate mounting the belt tensioner, as measured in the vertical direction in FIG. 12, is increased, the longitudinal size of the belt tensioner, as measured in the horizontal direction in FIG. 12, is reduced.

What is claimed is:

1. A belt tensioner comprising a fixed shaft of a fixed member, a pivotal member adapted to be rotated about said fixed shaft as the center of rotation, a tension pulley provided at the end of an arm member extended radially from said pivotal member and pivotally mounted on said pivotal member by a pivot extending parallel to said fixed shaft, a spring having one end retained by said pivotal member and adapted for applying to said pivotal member a spring force pressing said tension pulley to a belt, and a solid damping device provided between said pivot member and said fixed member and having one axial end secured to said pivotal member and the other axial end secured to said fixed member, wherein a relative movement between said fixed member and said pivotal member causes said solid damping device to be twisted, and the deformation of said spring and the deformation of said solid damping device during usage are adapted to be set independently of each other.

2. The belt tensioner according to claim 1 wherein the amounts of deformation of the spring and the solid damping device during the usage are set to different values.

3. The belt tensioner according to claim 1 wherein the amounts of deformation of the spring and the solid damping device during the usage are set to the same value.

4. The belt tensioner according to claim 1 wherein the spring is a torsion coil spring the one end of which has a first locking section locked by said fixed member and the other end of which has a second locking section locked by said pivotal member, and wherein engaging portions are provided at the fixed member and the pivotal member for prestressing said torsion coil spring.

5. The belt tension according to claim 4 wherein said solid damping device is a cylindrical rubber tube and wherein the fixed shaft has a relatively small-diameter, the rubber tube has a relative medium-diameter and the torsion coil spring has a relatively large-diameter, said fixed shaft, rubber tube and torsion coil spring being arranged coaxially with each other.

6. The belt tensioner according to claim 5 wherein a first meshing section formed in said fixed member having said fixed shaft meshes with a second meshing section formed in one end face of said solid damping device and wherein a third meshing section formed in a portion of said pivotal member meshes with a fourth meshing section formed in the other end face of said solid damping device.

7. The belt tensioner according to claim 6 wherein a first metallic member having the second meshing section and a second metallic member having the fourth meshing section are secured to one and the other ends of said solid damping device, respectively by a method selected from bonding and baking.

8. The belt tensioner according to claim 5 wherein the torsion coil spring comprises a wire having a rectangular cross-section formed by a short side and a long side wherein the short side is along the axis of the fixed shaft and the long side is along the radius of said fixed shaft.

9. The belt tensioner according to claim 8 wherein the torsion coil spring comprises a wire having multiple windings.

10. The belt tensioner according to claim 5 comprising a plurality of torsion coil springs in the form of multiple adjacent cylinders.

11. The belt tensioner according to claim 2 wherein the spring is a torsion coil spring the one end of which has a first locking section locked by said fixed member and the other end of which has a second locking section locked by said pivotal member, and wherein engaging portions are provided at the fixed member and the pivotal member for prestressing said torsion coil spring.

12. The belt tensioner according to claim 3 wherein the spring is a torsion coil spring the one end of which has a first locking section locked by said fixed member and the other end of which has a second locking section locked by said pivotal member, and wherein engaging portions are provided at the fixed member and the pivotal member for prestressing said torsion coil spring.

* * * * *